Sept. 10, 1946.  H. REINIGER  2,407,451
WING TIP GUN POSITION
Filed June 14, 1944  2 Sheets-Sheet 2
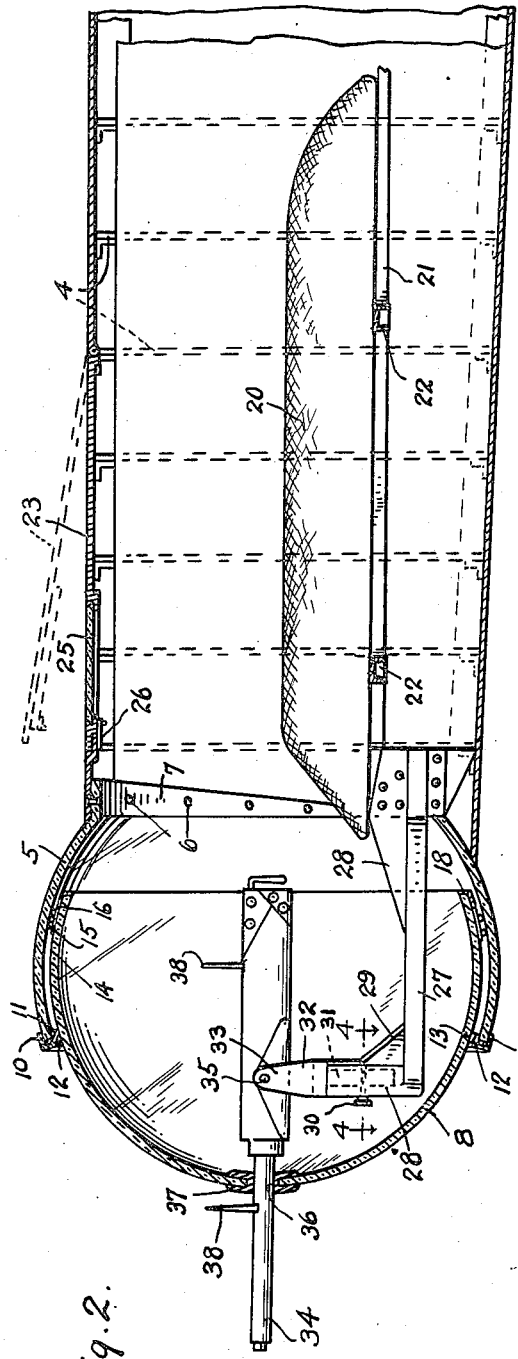
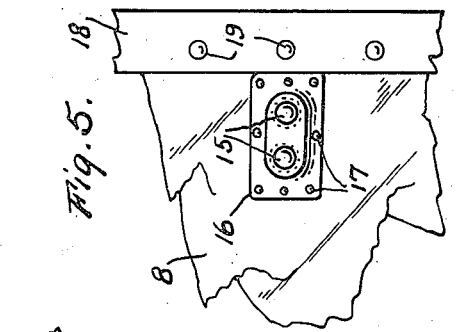
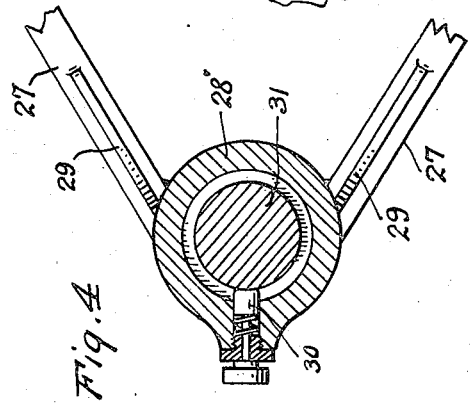
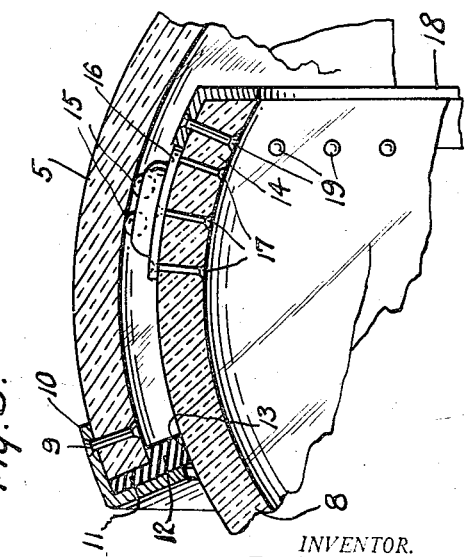
INVENTOR.
Haigh Reiniger
BY
Victor J. Evans & Co.
ATTORNEYS Patented Sept. 10, 1946

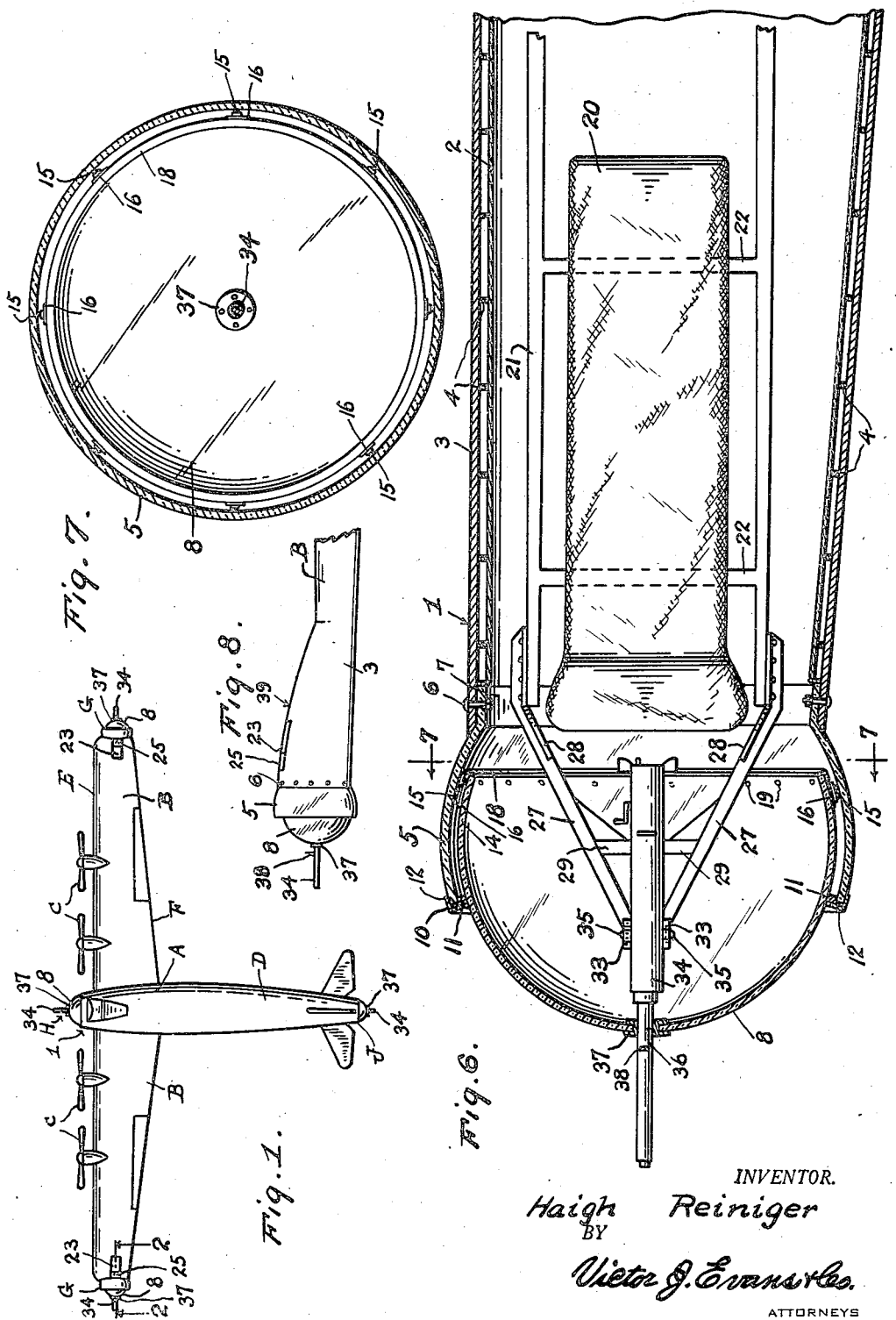

2,407,451

UNITED STATES PATENT OFFICE 2,407,451

WING-TIP GUN POSITION

Haigh Reiniger, Sebring, Fla.

Application June 14, 1944, Serial No. 540,289

6 Claims. (Cl. 89—37.5)

My present invention, in its broad aspect, has to do with improvements in gun mounts, and enclosing structure, for use in aircraft, and is especially adaptable for wing tip positions. More particularly, it is my purpose to provide structure for a gun and gunner's position in the wing tip of an aircraft wherein telescoping glass (Plexiglas) walls increase the range of the weapon, as for instance, a .50 calibre machine gun to as much as 120 degrees, and wherein a movable semi-spherical glass element is mounted on ball bearings for anti-frictional contact with another glass section built into the wing tip so that maximum visibility is obtained as well as a wide range of fire and at the same time the streamlining of the wing and structural sturdiness is preserved. In addition, accommodations for the gunner are improved, and rendered more adaptable for sighting. Due consideration being given to limitations of space within an aircraft wing tip, improved means are provided for increasing the comfort of the gunner as much as possible. My improved gun mount is so constructed and arranged that the problem of recoil is taken care of, while the gun mount itself is designed to occupy as little space as possible, and necessitates no weakening of wing structure.

Other and equally important objects and advantages of my invention are (1) my Plexiglas construction is greatly improved to render greater visibility and range of fire, as well as to increase structural sturdiness and ease of movement of parts with respect to each other, (2) the structural elements of mounting the glass parts in the wing structure are improved to increase strength and reduce loss of streamlining, (3) the cot or trough whereby the gunner maintains in comfort a normally prone (or lying down) position is unique and improved, (4) the position and maneuverability of the gun with respect to the gunner is novel, and assists in the attainment of more accurate fire, and (5) the general structure and mechanical organization is rendered more efficient, more practical, and is greatly simplified which is a desirable feature in aircraft construction.

While in the foregoing I have defined briefly some of the objects of my invention, others will be apparent as the description proceeds, but it is to be understood that changes in form, size, shape, arrangement, and construction of parts is permissible, provided such changes fall within the purview of my broad inventive concept.

In the drawings wherein I have illustrated my invention, and a modified form thereof:

Figure 1 is a top plan view of an aircraft of the type known as a four-motored, heavy bomber, to which my invention is shown applied:

Figure 2 is a vertical section taken on the line 2—2 of Figure 1:

Figure 3 is an enlarged sectional detail, partly fragmentary, of the meeting parts of the glass housing elements:

Figure 4 is a transverse section taken on the line 4—4 of Figure 2:

Figure 5 is a fragmentary plan view of a section of my movable housing showing the ball bearing members:

Figure 6 is a transverse or horizontal section taken through a wing tip:

Figure 7 is a section taken on the line 7—7 of Figure 6, and

Figure 8 is a detail view of a modified form of wing tip construction to accommodate my invention.

In the drawings wherein like characters of reference are used to designate like or similar parts, throughout the several views thereof:

The numeral 1 designates the tip of an aircraft wing of conventional design having the usual spars 2, skin 3 and ribs 4. My wing tip gun position is especially desirable when used with four-motored heavy bombers such as I have indicated in Figure 1 since the wing construction of these larger planes is more adaptable to housing a gunner and a gun in the wing tip, however, my invention is not limited to use with any particular type of aircraft, nor for that matter are the features of construction limited to use in a wing tip position. Referring to Figure 1, wherein an aircraft A has wings B, motors C, a fuselage D, a leading edge E and a trailing edge F, it will be noted that when my wing tip gun positions G are added to the armament represented by the nose gun and the tail gun H and J respectively, a greatly increased measure of protection is attained.

A stationary parti-spherical glass structure 5 is bolted as at 6 to the skin and spar structure through a flanged part 7 to make a streamlined, tight and sturdy connection. It will be noted that the diameter of the stationary structure 5 is greater than any diameter of the wing tip, thus giving a "bulb" effect. Mounted to revolve within the structure 5 is a movable glass semi-spherical element 8: the structures 5 and 8 approaching together almost a spherical design.

Riveted as at 9 to the outer edge of the Plexiglas housing member 5 is a ring 10 which is substantially right-angular in cross section and carries a gasket 11 which protects the edge of structure 5 as shown at 12 and also forms a wiping contact 13 with semi-spherical housing element 8 to make the interior of the housing wind and weather-proof and to absorb shock and the like. It will be noted that element 8 extends a considerable distance 14 within and spaced from element 5 and to facilitate movement of element 8 with respect to element 5 I provide a series of double ball-bearing units 15—shown in detail in Figures 3 and 5. Each set of balls has a frame or keeper 16 riveted to element 8 as at 17, and the series of sets are spaced from each other and mounted adjacent the substantially right-angular guard flange 18 riveted to the edge of element 8 as shown at 19. From the foregoing, it will be seen that the edges of elements 5 and 8 are well protected, that the union between elements 5 and 8 is rendered wind and weather-proof, and that element 8 is freely and anti-frictionally mounted with respect to element 5.

Back of the transparent Plexiglas housing formed by elements 5 and 8 is mounted a cot or trough 20 upon which the gunner reclines in a prone position within the wing structure. The cot 20 is carried on a frame having longitudinal and transverse bars 21 and 22 respectively—see Figure 6—within the wing structure, and above which is swingably mounted a hatch or trap door 23 which has a glass skylight 25 and is latched in closed position as at 26.

My gun mount has angularly arranged side bars 27 bolted at their ends to longitudinal bars 21 and which extend forwardly in front of the gunner and are braced to the primary parts of the wing structure as at 28 to absorb recoil. Cross braces 29 are provided and the forward ends of the bars 27 are integral with or joined to a cylindrical post 28 which is reinforced at 29. Mounted for swiveling movement in the post 28 and held properly by the spring pin 30 is a standard 31 having an enlarged bifurcated upper part 32 providing the space arms 33 between which a gun 34—preferably a .50 calibre machine gun—is mounted and pivoted as at 35, so that the gun may be sighted both laterally and vertically through a wide range—preferably about 120°. The gun extends through an opening 36 in the glass element 8 and in moving the gun to sight the same the element 8 moves with it. A suitable gasket 37 is provided where the gun projects through the opening 36. The gun has the usual sight 38.

In the modified form shown in Figure 8, the wing tip structure is swept up as at 39 to meet the element 3 forming a stream-lined effect and providing more room for the gunner.

In operation, the gunner lies prone on the cot and sights the gun to any desired position, and it is manifest that the gunner is less exposed and more comfortable than in structures usually proposed. Furthermore, the triangular construction of the gun mount increases sturdiness and absorbs recoil.

Since in the foregoing I have described the construction and arrangement of the parts of my invention with such attention to detail as will impart a clear understanding of its construction, operation and advantages, the broad concept of my invention must follow accepted interpretation thereof and should be made only by reference to the appended claims.

I claim:

1. A gun position for aircraft having a fuselage and wing supporting surfaces comprising partially telescoping substantially parti-spherical glass sections, one of which is fixed to the wing of the aircraft, the other section being movable with respect to the first section, anti-friction mountings between the sections, a gunner's position in the wing of the aircraft accessible to the interior of said sections, and a gun accessible to the gunner and protruding through the movable section.

2. A wing tip gun position for aircraft having a fuselage and wing supporting surfaces comprising a substantially parti-spherical glass housing formed in partially telescoping sections, one of which is fixed and attached to the wing tip of the aircraft and accessible to the interior of the wing tip, anti-friction bearings between the movable section and the fixed section, a gun mount, a gun on the mount and extending through the movable section, a support for the gunner in the interior of the aircraft wing tip, and the interior of the housing being inaccessible to the gunner.

3. The invention as described in claim 2, comprising a triangular gun mount attached to primary structural elements of an aircraft wing, a hollow post thereon, a gun standard swivelly mounted in the post, and a gun pivotally mounted for vertical swinging movement on the standard.

4. The invention as described in claim 2, comprising protecting flanges for the edges of the housing sections, a weather-proof gasket on the edge of one housing and having wiping contact with the other housing, and ball bearing anti-friction bearings between the two housings.

5. The invention as described in claim 2, comprising a cot structure mounted in the interior of the wing tip for the gunner, and positioned to support the gunner in a prone position back of the gun, and a door in the structure of the wing giving access to the gunner.

6. The invention as described in claim 2, the sections of the housing being mounted for movement to a maximum of 120° movement of the gun, and said fixed section having stream-lined and weather-tight connection with the structure of the wing.

HAIGH REINIGER.